Aug. 18, 1931.  W. WILKIE ET AL  1,819,936
CAPSULE FILLING MACHINE
Filed March 1, 1928   8 Sheets-Sheet 2

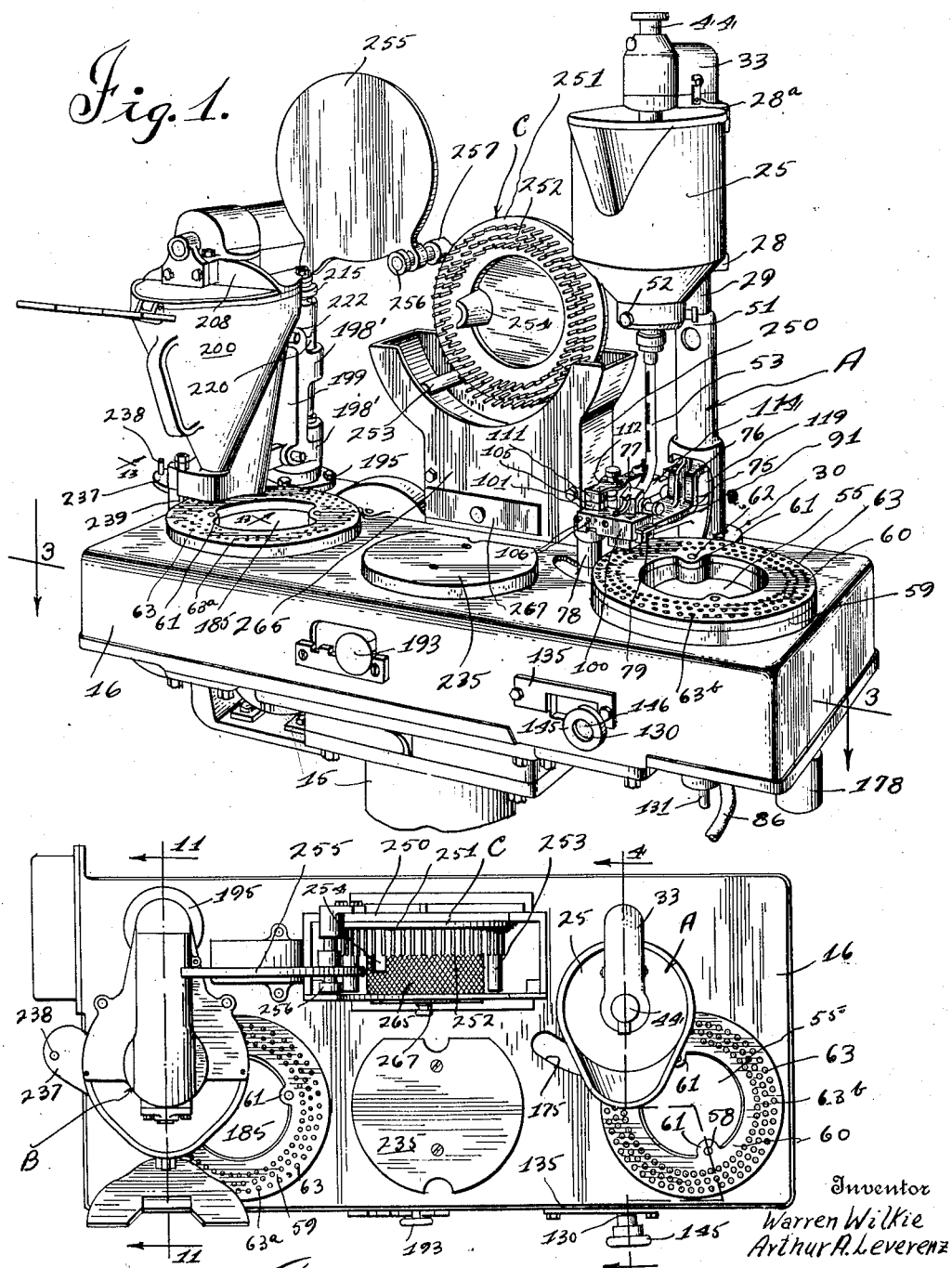

Inventor
Warren Wilkie
Arthur A. Leverenz
By Whittemore Hulbert
Whittemore & Belknap
Attorneys Aug. 18, 1931.   W. WILKIE ET AL   1,819,936
CAPSULE FILLING MACHINE
Filed March 1, 1928   8 Sheets-Sheet 3
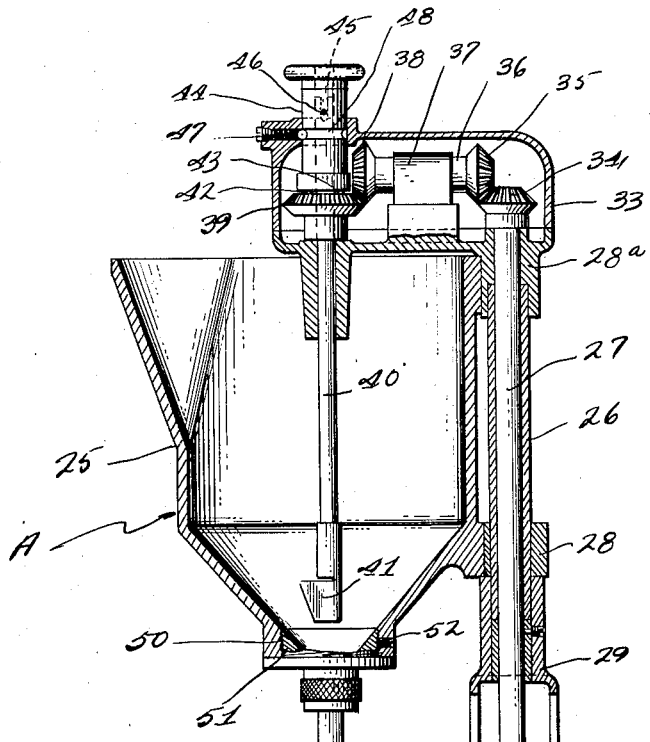
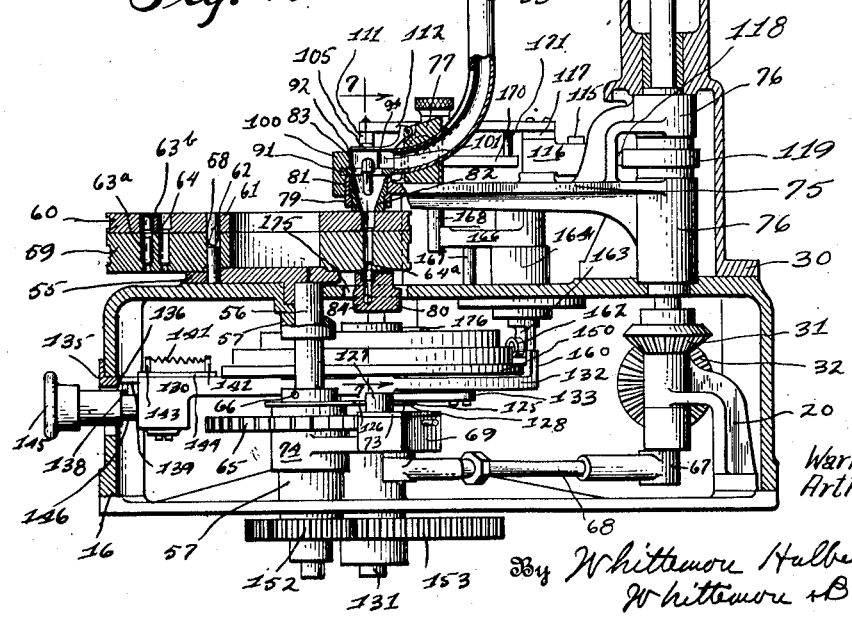
Fig. 4.
Inventor
Warren Wilkie
Arthur A. Leverenz
By Whittemore Hulbert
Whittemore & Belknap
Attorneys Inventor
Warren Wilkie
Arthur A. Leverenz

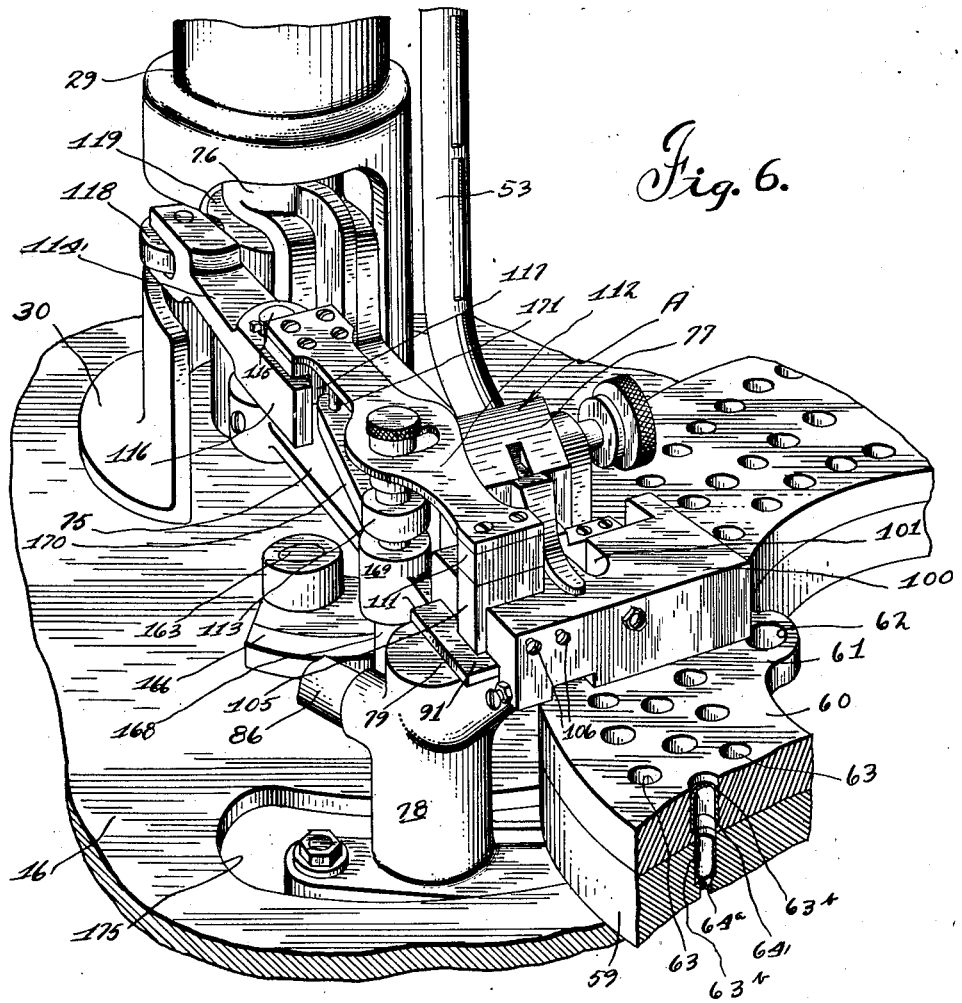
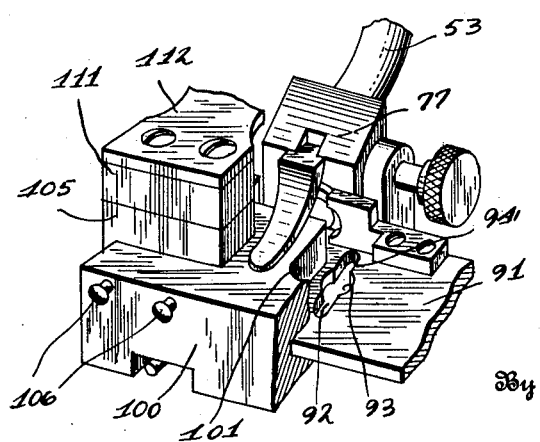

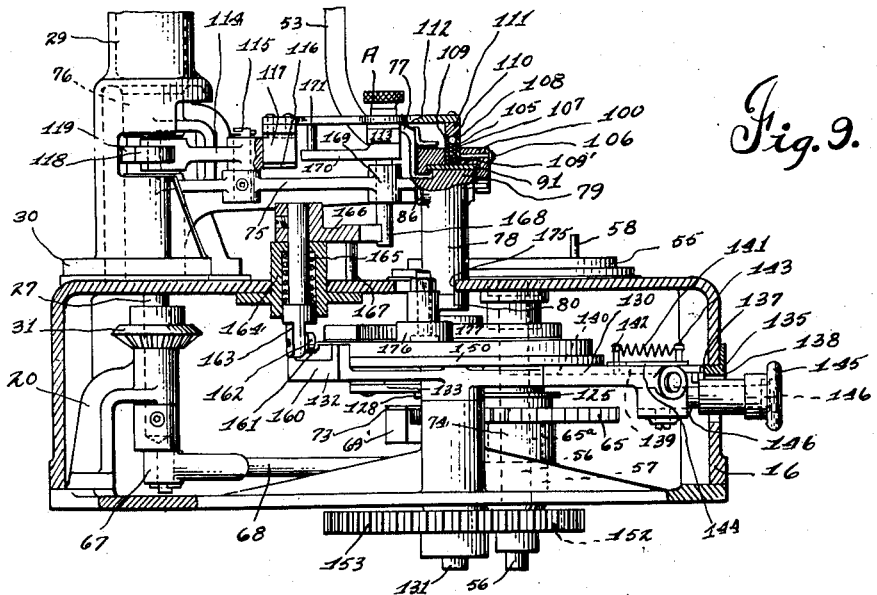

Aug. 18, 1931.  W. WILKIE ET AL  1,819,936
CAPSULE FILLING MACHINE
Filed March 1, 1928  8 Sheets-Sheet 8
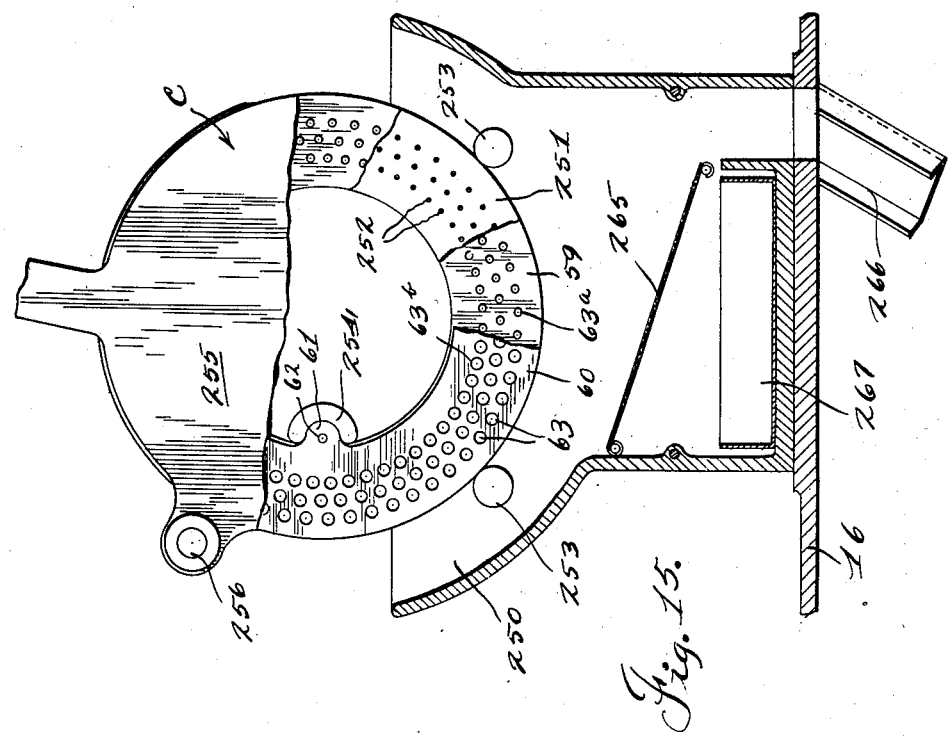
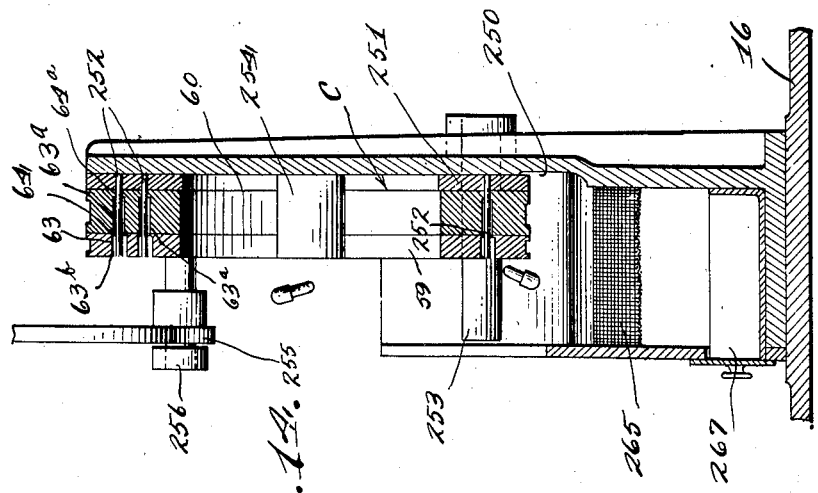
Inventor
Warren Wilkie
Arthur A. Leverenz
By Whittemore Hulbert
Whittemore & Belknap
Attorneys Patented Aug. 18, 1931

1,819,936

UNITED STATES PATENT OFFICE

WARREN WILKIE AND ARTHUR A. LEVERENZ, OF DETROIT, MICHIGAN, ASSIGNORS TO PARKE, DAVIS COMPANY, OF DETROIT, MICHIGAN, A CORPORATION OF MICHIGAN

CAPSULE FILLING MACHINE

Application filed March 1, 1928. Serial No. 258,340.

This invention relates to capsule filling machines and has as an object to simplify, render more efficient, and improve generally machines of this character.

This invention has as an object to provide a common drive for all of the elements of the apparatus and to provide means for automatically disconnecting certain of these elements from the said drive.

Another object of this invention is to provide means for feeding capsules into a plurality of openings, which openings are preferably spirally arranged, and to provide means whereby the said feeding mechanism will follow the spiral of the openings.

Other objects and advantages of this invention will become apparent as the following description proceeds, particularly when reference is had to the accompanying drawings, wherein, Figure 1 is a perspective view of an apparatus constructed in accordance with the invention;

Figure 2 is a top plan view of the apparatus;

Figure 4 is a vertical sectional view taken on the line 4—4 of Figure 2;

Figure 6 is a detailed perspective view of a portion of the apparatus;

Figure 7 is a vertical sectional view taken on the line 7—7 of Figure 4;

Figure 8 is a detailed perspective view with certain parts broken away of a portion of the structure shown in Figure 6;

Figure 9 is a section taken on the line 9—9 of Figure 3;

Figure 10 is a section taken on the line 10—10 of Figure 3;

Figure 14 is a section through the capsule ejecting mechanism showing one of the capsule holding plates in position therein, and Figure 15 is an elevational view with parts broken away of the structure shown in Figure 14.

Figure 3:
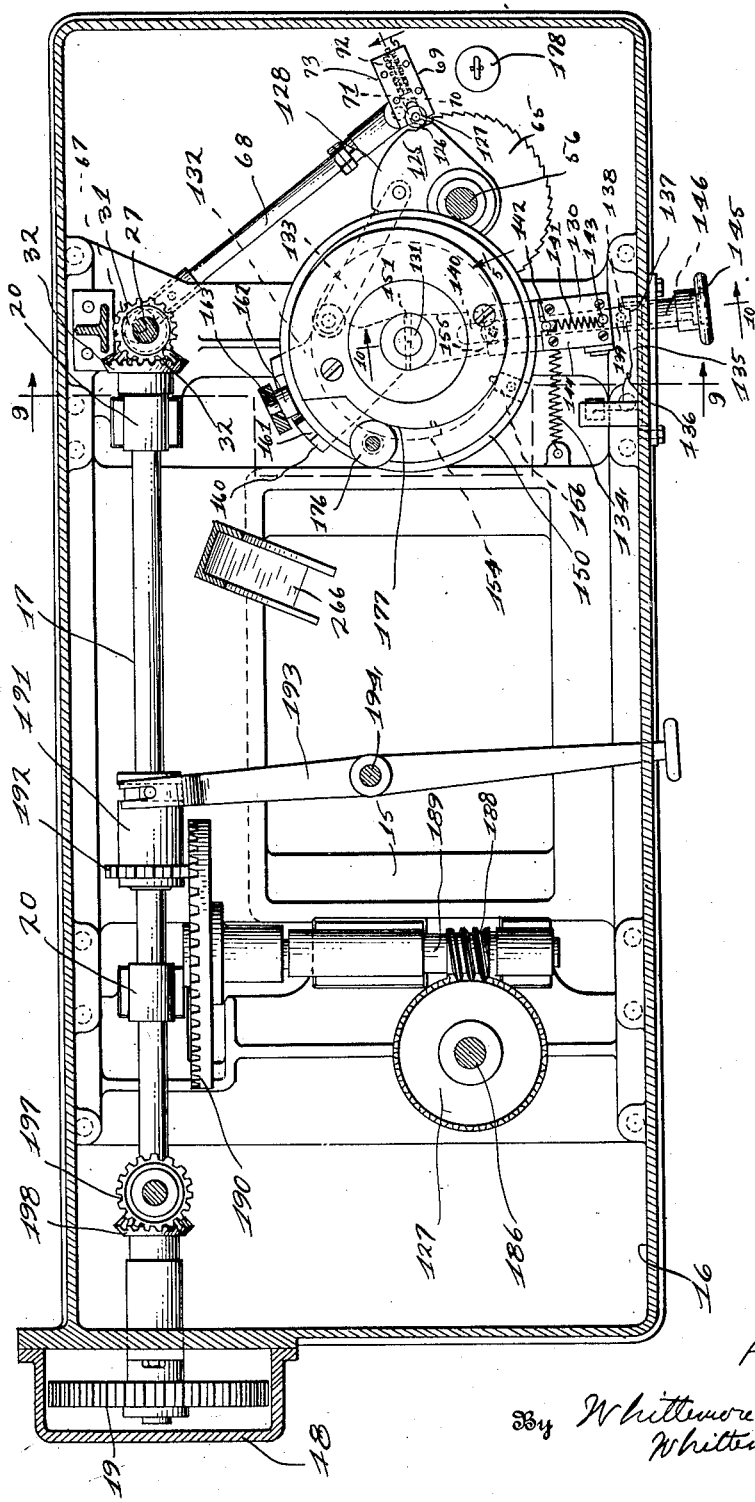
Figure 3 is a horizontal view taken on the line 3—3 of Figure 1.
Figure 5:
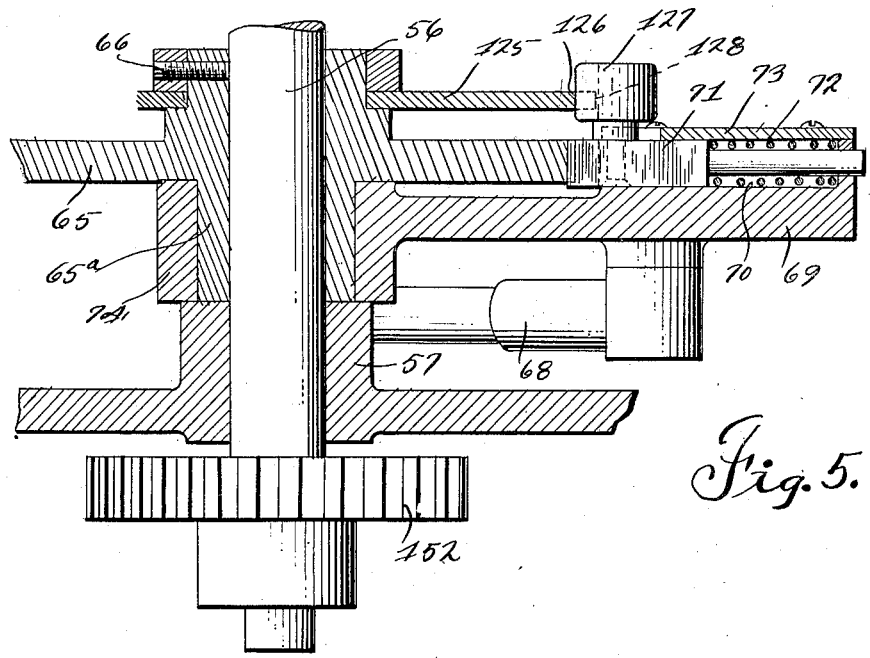
Figure 5 is a vertical sectional view taken on the line 5—5 of Figure 3.
Figure 13:
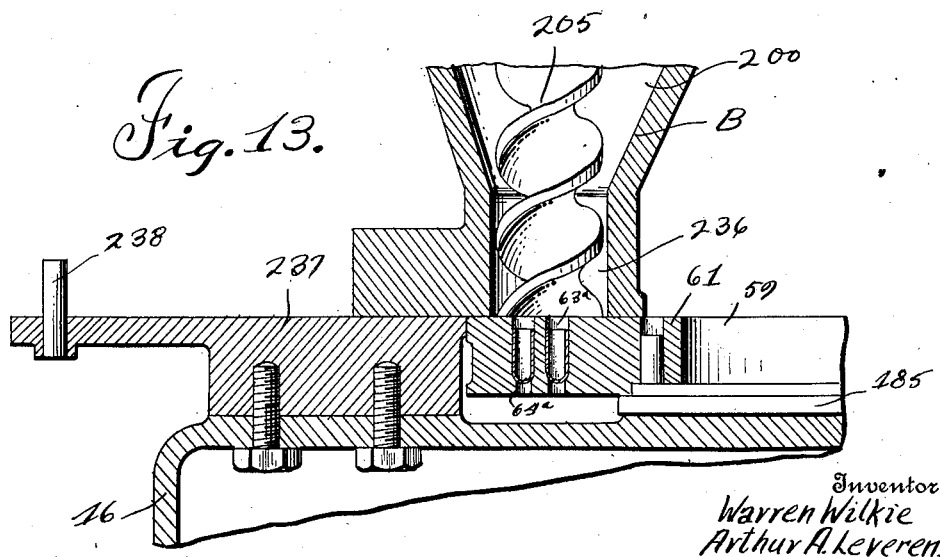
Figure 13 is a section taken on the line 13—13 of Figure 1.

Referring now particularly to the drawings, wherein like reference characters designate corresponding parts throughout all views, 15 designates a pedestal, which is preferably hollow and which supports at its upper end the base 16 of the apparatus. The base 16 forms a support for the three units of the apparatus, namely, the capsule feeding and unjoining mechanism A, the capsule filling mechanism B, and the capsule ejecting mechanism C.

For driving the moving parts of the units A and B there is provided a drive shaft 17 which extends longitudinally through the base 16 adjacent the rear edge of the same. As clearly illustrated in Figure 3 of the drawings, the drive shaft 17 projects through one end of the base 16 into a housing 18 in which is mounted a driving gear 19, which may receive power from any suitable source, not shown. As also clearly illustrated in Figure 3 of the drawings, the base 16 is hollow to form a housing for the various driving mechanisms hereinafter to be described, and the shaft 17 is supported in suitable spaced bearings 20 arranged in the base 16.

By reference to Figures 1 and 4, it will be noted that the unit A, which includes the capsule feeding and unjoining mechanism, comprises a hopper 25 rotatably mounted on a sleeve 26, which sleeve surrounds a shaft 27 which extends from a point within the base 16 to a point spaced vertically above the base 16. The lower supporting arm 28 of the hopper 25 is adapted to be supported on the upper end of a housing 29, which surrounds the shaft 27 and which is secured as at 30 to the top of the base 16. As brought out before, the hopper 25 is swivelly mounted on the sleeve 26, whereby it may be moved to any desired angle around the shaft 27.

At its lower end the shaft 27 is provided with a bevelled gear 31 adapted to mesh with a corresponding gear 32 carried by the free end of the drive shaft 17. The upper end of the shaft 27 projects beyond the upper edge of the hopper and into a housing 33 carried by the upper arm 28a of the hopper 25. The shaft 27 is provided at its upper end with a bevelled gear 34 adapted to mesh with a bevelled gear 35 carried by one end of a shaft 36 which shaft is journalled in a bearing 37 supported in the housing 33. The opposite end of the shaft 36 is provided with a bevelled gear 38 adapted to mesh with a bevelled gear 39 loosely mounted on a shaft 40, which extends down into the hopper 25.

The shaft 40 is provided at its lower end with a flat paddle 41 which serves as an agitator for the capsules within the hopper 25. For clutching the gear 39 to the shaft 40 there is provided the following mechanism. Carried by the upper face of the gear 39 are a plurality of pins 42 adapted to be clutchingly engaged with pins 43 formed on the lower end of a sleeve 44 slidably and rotatably mounted on the shaft 40. The free end of the shaft 40 is slotted, as at 45, to receive a pin 46 carried by the sleeve 44. A spring pressed ball 47, carried by the housing 33, is adapted to engage a groove 48 formed in the sleeve 44 to hold the sleeve in its lowermost position, in which position the pin 46 is arranged in the slot 45 and the pins 42 are engaged with the pins 43.

With the parts in this position, it is obvious that rotation of the gear 39 will be transmitted to the sleeve 44 and subsequently to the shaft 40 through the pin and slot connection 46 and 45 respectively. To uncouple the shaft 40 from the gear 39, the sleeve 44 may be pulled upwardly, the ball 47 being moved backwardly against the tension of its spring. In the uppermost position of the sleeve 44 the pins 42 and 43 will be out of engagement with each other, and the pin 46 will be positioned out of the slot 45.

The lower end of the hopper 25 is provided with an opening 50 adapted to receive a plug 51, which plug may be held in place as by a set screw 52. The plug 51 is interiorly provided with tapered walls which coincide with the taper of the bottom of the hopper and supports a tube or conduit 53 through which the capsules from the hopper 25 may be fed downwardly to a suitable positioning mechanism hereinafter to be described.

Carried by the base 16 and arranged in juxtaposition to the upper face of the same is the capsule unjoining mechanism. This mechanism includes a drive plate 55 mounted on the upper end of a stub shaft 56 journalled in bearings 57 formed in the base 16. The drive plate 55 is provided with upwardly projecting pins 58 to provide positioning means for the capsule receiving plates 59 and 60 respectively. The plates 59 and 60 are annular members provided on their inner periphery with bosses 61 provided with sockets 62 adapted to receive the pins 58 carried by the drive plate 55.

The plates 59 and 60 are provided with apertures 63 arranged in a continuous spiral, as clearly illustrated in Figures 1 and 2 of the drawings. The apertures in the two plates are aligned but are, however, of different diameter, as clearly illustrated in Figure 4 of the drawings. More particularly each aperture 63$^a$ in the lower plate is of a diameter sufficient to receive the base or the smaller part of a capsule, while each aperture 63$^b$ in the upper plate is of a greater diameter to receive the large head of the capsule. Further, shoulders 64 are formed adjacent the lower ends of the apertures 63$^b$ to prevent movement of the capsule heads through the apertures 63$^b$.

For driving the plate 55 and the plates 59 and 60 to successively position each aperture 63 beneath the capsule positioning mechanism, hereinafter to be described, there is provided a ratchet wheel 65 rigidly mounted on the shaft 56, as by the set screw 66. Eccentrically secured to the base of the shaft 27, as at 67, is an arm 68 which is pivotally secured at its free end to a block 69 formed integral with a sleeve 74 rotatably mounted on a base 65$^a$ formed on the ratchet wheel 65. This block is provided with a groove 70 adapted to receive a pawl 71, which pawl is constantly urged outwardly into engagement with the teeth on the ratchet wheel 65 by a spring 72. A suitable cover plate 73 serves to hold the pawl 71 and spring 72 in the groove 70.

Obviously rotation of the shaft 27 causes a reciprocation of the arm 68, which reciprocation is converted into rotary movement of the shaft 56 by virtue of the engagement of the pawl 71 with the ratchet wheel 65. Further it will be noted that the shaft 56 will be intermittently operated so that each aperture 63 will be momentarily held under the capsule positioning mechanism.

In operation the capsules are adapted to be indiscriminately supplied to the hopper 25 and from there fed down into the apertures 63 and then unjoined by the attachment of a suction line to the lower end of the aperture 63$^a$. The cap of the capsule being prevented from movement entirely through the aperture 63$^b$ is held in the upper plate 60, while the base of the capsule is drawn downwardly into the aperture 63$^a$ in the lower plate 59 until it abuts against a shoulder 64$^a$ formed in the lower aperture 63$^a$.

For directing the capsules from the conduit 53 to the various apertures 63, there is provided a supporting platform 75 mounted for rotation about the shaft 27, as by the spaced bracket arms 76. As clearly illustrated in Figure 4 of the drawings, the lower bracket arm 76 bears at its lower end on the top of the base 16, whereby the platform 75 is maintained in spaced relation to the top of the base 16. The platform 75 carries at its outer end an upwardly extending block 77 through which the lower end of the conduit 53 passes. The platform 75 is further provided with a U-shaped free end portion 78, the legs 79 and 80 of which are arranged respectively above and below the plates 59 and 60.

This structure is clearly illustrated in Figure 7 of the drawings wherein it will be noted that the legs 79 and 80 are so constructed as to lie in juxtaposition to opposite ends of the same aperture 63 in the plates 59 and 60. The upper leg 79 is apertured at 81 to receive a plug 82, which plug is centrally apertured, as at 83, to form a passage for the capsules to the respective apertures 63. The lower leg 80 is provided with a passage 84 which is adapted to register with the lower end of that aperture 63 with which the passage 83 is in communication. The passage 84 communicates with a passage 85 formed in the base of the U 78, and the passage 85 is connected by a suitable conduit 86 to a source of suction, not disclosed.

As the passage 83 is brought into successive registration with the apertures 63, the capsules are deposited in the apertures 63 and the bases of the capsules are withdrawn from the caps of the capsules by the suction established in the apertures 63ª through the conduits 84, 85, and 86.

For positioning the capsules in the apertures 63 with the smaller ends of the capsules arranged downwardly, there is provided the following mechanism. Secured to the top of the leg 79, as by the screws 90, is a plate 91. This plate is provided with a slot 92, which registers with the passage 83 in the plug 82. By reference to Figure 8 of the drawings, it will be noted that the slot 92 is provided with a relatively wide center portion 93 and relatively narrow end portions 94. The center portion 93 is of a sufficient width to permit the passage through the plate of the cap of the capsule, while the restricted portions 94 are of such width as to prevent the passage of the top of the capsule through the plate 91 but to permit the passage of the bases of the capsules through the plate 91.

For preventing the discharge of more than one capsule at a time into the slot 92 from the conduit 53 there is provided a plate 100 mounted for reciprocation on the plate 91 and leg 79. As clearly illustrated in Figure 8 of the drawings, this plate is provided with a slot 101 which in one position of its reciprocatory movement registers with the end of the conduit 53 and which in its other position of reciprocatory movement registers with the slot 92.

In operation, as each capsule falls out of the end of the chute or conduit 53, it is received in the slot 101 in the plate 100, whereupon the plate 100 moves across the platform 91 to position this capsule over the slot 92. Regardless of the position of the capsule in the slot 101 the lower end or the base of the capsule will initially drop through one of the restricted end portions of the slot 93, whereby the capsule will be turned to a vertical position with its base down. The top of the capsule will then pass through the enlarged portion 93 of the slot 92, and the capsule will be positioned in its respective aperture 63.

For reciprocating the plate 100 there is provided a lug 105 rigidly secured to the plate 100, as by the bolts 106. This lug 105 is provided with a socket 107, as clearly illustrated in Figure 9 of the drawings. This socket is reduced at its upper end and is adapted to receive a ball 108 urged upwardly by a spring 109. The arrangement is such that the ball projects slightly above the upper face of the lug 105. This ball is adapted to engage a depression 110 formed in the lower face of a lug 111 carried by the end of a pivoted arm 112. This arm 112 is pivoted on a support 113 with which it has slotted engagement, as clearly shown in Figure 6 of the drawings.

For swinging the arm 112 about its pivot, there is provided an arm 114 pivotally mounted on a stud 115 carried by the platform 75. The arm 114 is provided at its one end with the furcations 116 adapted to engage a depending lug 117 carried by the free end of the arm 112. The other end of the arm 114 is bifurcated to receive a roller 118 which engages with a cam roller 119 mounted on the shaft 27 between the brackets 76. The cam 119 is adapted to rotate with the shaft 27, whereupon the arm 114 will be swung about its pivot 115 and the arm 112 will be swung about its pivot 113. Obviously swinging of the arm 112 will effect a reciprocation of the plate 100 by virtue of the connection of the lug 111 with the lug 105 through the ball 108.

For effecting a disengagement of the pawl 71 with the ratchet wheel 65, there is provided a plate 125 rotatably mounted on the shaft 56, as clearly shown in Figures 3 and 4 of the drawings. This plate 125 is provided with a cut away portion 126 adapted to receive a roller 127, which roller is carried by the pawl 71. When the parts are in the position shown in Figure 3, the pawl 71 is in its forward position by virtue of the reception of the roller 127 in the cut away portion 126 and the pawl is in engagement with the ratchet wheel 65. When, however, the plate 125 is swung about its axis its periphery 128 engages the roller 127 to force the pawl 71 backwardly against the tension of the spring 72 and to hold the pawl out of engagement with the ratchet wheel 75. It will thus be seen that when the plate 125 is properly shifted about its axis the drive between the shaft 27 and the shaft 56 will be disconnected, whereby rotation of the plates 59 and 60 will be stopped.

For actuating the plate 125, there is provided an arm 130, which arm is rotatably mounted on a shaft 131 arranged parallel to and spaced from the stub shaft 56. The arm 131 is provided with a flared end portion 132 which is connected by a link 133 with the plate 125. Obviously rotation of the arm 130 about its axis tends to shift the plate 125 to either of its extreme positions.

A spring 134 secured to a fixed part of the base 16 and to the arm 130 tends to urge the arm toward the left to swing the plate 125 to its position wherein it disengages the pawl 71 from the ratchet wheel 65. For holding the arm 130 in the position shown in Figure 3 of the drawings, in which position the pawl 71 is in engagement with the ratchet wheel 65, there is provided a plate 135 secured to the side wall of the base 16 and projecting inwardly from this wall. This plate is provided with the notches 136 and 137 and the arm 130 is provided with a lug 138 adapted to be selectively positioned in either of these notches. The lug 138 is carried on the end of a slide 139 mounted in a groove 140 formed in the upper face of the arm 130 and is urged outwardly into engagement with the notches 136 and 137 by a spring 141 secured at one end to a pin 142 carried by the slide 139 and secured at its other end to a pin 143 carried by a cover plate 144 mounted on the arm 130. The spring 141 tends to hold the lug 138 in either of the aforesaid notches and to thereby hold the arm 130 in its shifted position.

For actuating the arm 130 there is provided a knob 145 slidably mounted on a pin 146 carried by the free end of the arm 130. The knob 145 projects out beyond the base 16, whereby it may be conveniently manipulated by the operator. By virtue of the sliding engagement of the knob 145 on the pin 146 the rotation of the plates 59 and 60 may be quickly checked by merely striking the knob 145. Striking of the knob 145 causes the same to move inwardly, whereupon it strikes the lug 138 to knock the same out of the notch 137, whereupon the spring 134 will put the arm 130 to its position where the drive to the plates 59 and 60 will be disconnected.

For automatically shifting the arm 130 upon the completion of a predetermined number of revolutions of the plates 59 and 60 there is provided a disk 150 rigidly secured to the shaft 131, as by the pin 151. The shaft 131 is adapted to be driven from the shaft 56 by the reduction gearing 152 and 153, so that during the rotation of the shaft 56 the disk 150 is rotated at a much slower speed, the ratio being preferably 1 to 3. The disk 150 is provided on its under-face with a shoulder 154 adapted to form a track for a roller 155, carried by the slide 139. A pin 156 carried by the disk 150 projects beyond the shoulder 154 to engage the roller 155 upon a complete rotation of the disk 150. In operation the disk 150 makes one revolution to 3 revolutions of the plates 59 and 60 and the pin 156 engaging the roller 155, forces the slide 139 inwardly to to release the lug 138 from the notch 137, whereupon the spring 134 will draw the arm 130 to its off-position. It will thus be seen that after the plates 59 and 60 have been rotated three times the drive will be disconnected.

There is further provided means for automatically unclutching the lug 105 from the lug 111 when the arm 130 is shifted to its off-position. By reference to Figures 3 and 9, it will be noted that the flared end portion 132 of the handle 130 extends beyond the periphery of the disk 150 where it is bent upwardly to form a flange 160 which lies adjacent to and conforms to the curvature of the periphery of the disk 150. This flange is provided with a cam shaped upper edge 161 on which a roller 162 carried by an arm 163 is adapted to ride. The arm 163 is slidably mounted in a bearing 164 formed in the base 16 and is urged downwardly to maintain the roller 162 in engagement with the cam 161 by a spring 165. The pin 163 carries at its upper end a platform 166 which is mounted for sliding movement on a suitable guide pin 167 carried by the base 16. The platform 166 is provided with an upstanding pin 168 which is slidably mounted in a bearing 169 formed in the platform 75 and which projects through the bearing 169 to support a platform 170 on which the lever 112 is pivotally mounted. The platform 170 is provided with an upstanding pin 171 which engages a portion of the lever 112 spaced from its pivot point.

In operation, when the arm 130 is shifted to its off-position, either manually or by the actuation of the pin 156, the cam 161 is moved so that the high part of this cam engages the roller 162 to raise the pin 163 and subsequently to raise the platforms 166 and 170 to finally raise the lever 112 until the ball 108 is out of engagement with the socket 110. This obviously disconnects the plate 100 from the arm 112 to prevent further reciprocation of the plate 100.

For causing the passage 83 in the plug 82 to follow the spiral of the apertures 63 there is provided the following mechanism. The base of the U-shaped member 78 extends through a slot 175 in the base 16. At its lowermost point the U-shaped member 78 is provided with a roller 176 adapted to engage a cam surface 177 carried by the disk 150. A weight 178 is connected by means of a rope or chain 179, passing over a roller 180 carried by the base 16, with the leg 80 of the U-shaped member 78. The weight tends to draw the U-shaped member 78 to the right, as seen in Figure 7, and to thus swing the platform 75 and its associated structure about the shaft 27 and to cause the passage 83 to travel radially inward of the plates 59 and 60. The cam roller 176 limits the inward movement of the passage 83 so that the same follows the spiral of the sockets 63.

As clearly illustrated in Figure 1 of the drawings, the unit A above described is preferably mounted on the right of the base 16. Mounted on the extreme left of the base 16 is the unit B, which constitutes the capsule filling unit.

This unit includes the drive plate or platform 185, which platform is similar to the plate 55 and is adapted to receive either or both of the plates 59 and 60. The platform 185 is mounted on a stub shaft 186 journalled in suitable bearings carried by the base 16 and is adapted to be driven through a gear 187, mounted on the shaft 186 and a worm 188 mounted on a shaft 189 arranged transversely of the base 16. The shaft 189 carries at its rear end a gear 190, which gear is provided with a plurality of annular rows of teeth. A collar 191 keyed to the drive shaft 17 carries a gear 192 which is adapted to be selectively moved into engagement with any one of the annular rows of teeth carried by the gear 19. For moving the collar 191, there is provided a lever 193 pivoted in the base, as at 194, and extending through the front of the base to be actuated by the operator. Obviously, movement of the gear 192 radially of the gear 190 varies the drive of the shaft 186 from the shaft 17. For example, when the gear 192 engages the outermost row of teeth on the gear 190, the drive is relatively slow, while when the gear 192 is moved inwardly to engage the smallest row of teeth, the drive is faster for the shaft 186.

Secured to the base 16 in the rear of the platform 185 is a boss 195 adapted to form a bearing for a shaft 196 which extends vertically above the base 16 and which is operably connected at its lower end to the drive shaft 17 by virtue of the bevelled gears 197 and 198. Surrounding the shaft 196 is an elongated bushing 197' which forms a support for the bracket arms 198' of a bracket 199 adapted to support a hopper 200. The bracket 199 is rotatably mounted on the bushing 197', whereby the hopper 200 may be swung about the shaft 196 as an axis to position the hopper over the platform 185.

For agitating the powder or other material within the hopper 200 and for forcibly feeding the same into the capsules supported in the plate 59 on the platform 185, there is provided a screw element 205 arranged centrally of the hopper 200 and driven from a shaft 206 journalled in a housing 207 supported from the hopper 200 by a platform 208. The shaft 206 is provided at its upper end with a bevelled gear 209 which engages a bevelled gear 210 mounted on a shaft 211 carried by the housing 207. The shaft 211 extends through a suitable bearing 212 and is provided at its opposite end with a bevelled gear 213 adapted to engage a bevelled gear 214 carried by a bushing 215 mounted in the platform 208 above the shaft 196.

There is further provided within the hopper 200 a knife 216 which is adapted to engage the inner periphery of the hopper 200 to prevent adhering of the powder within the hopper to the walls thereof. This knife 216 is carried by a collar 217 secured to a bushing 218, which bushing is adapted to be rotatably driven from the shaft 211 by the bevelled gears 219 and 220.

It is desirable that the screw 205 and the knife 216 be actuated only when the hopper 200 is positioned in discharging position over the platform 185. To accomplish this there is provided the following clutching mechanism.

Figures 11, 12:
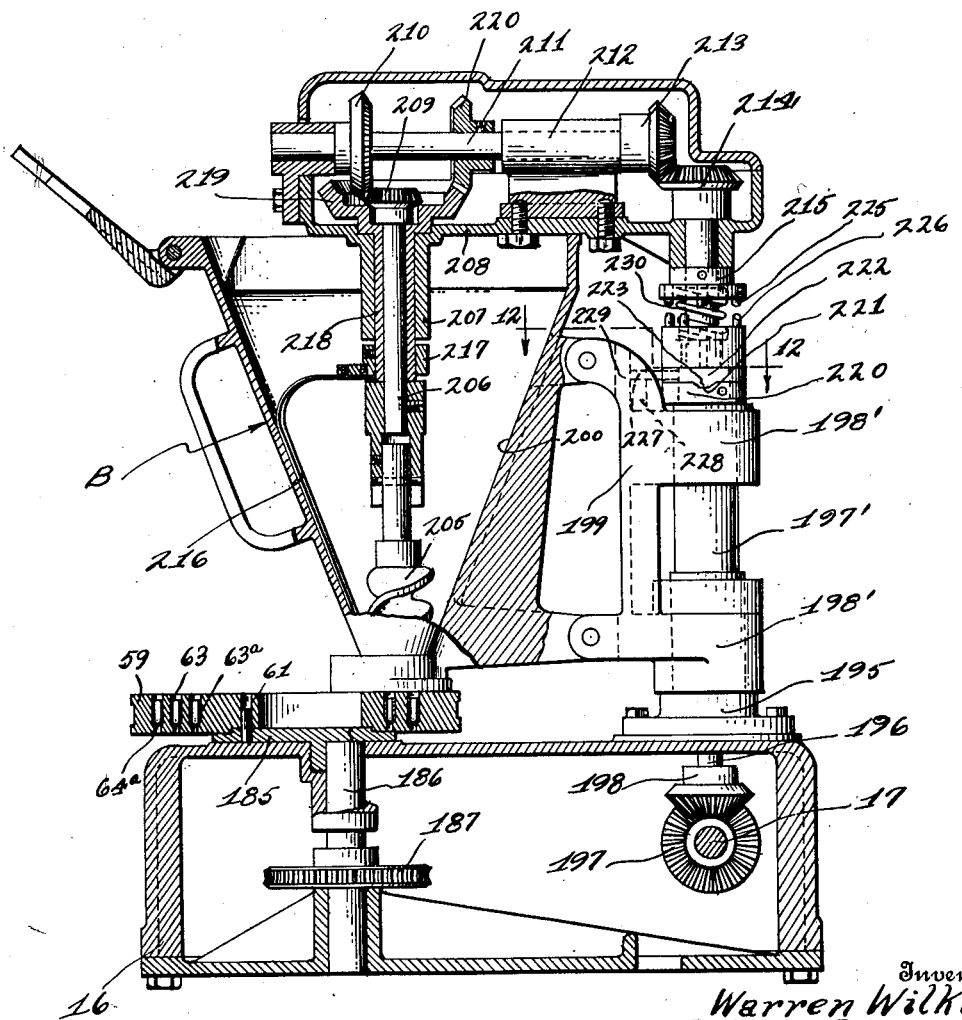
Figure 11 is a vertical section taken on the line 11—11 of Figure 2.
Figure 12 is a vertical section taken on the line 12—12 of Figure 11.

Rigidly secured to the bushing 197' is a collar 220 provided on its upper face with diametrically opposite grooves 221. Keyed to the shaft 196 above the collar 220 is a sleeve 222 provided on its lower edge with lugs 223 adapted to engage the grooves 221 in the collar 220. The bushing 215 is provided on its lower edge with pins 225 adapted to be clutchingly engaged by pins 226 carried by the upper edge of the sleeve 222 when the sleeve is forced upwardly. For forcing the sleeve upwardly upon movement of the hopper 200 to a position over the platform 185, there is provided a pin 227 carried by the sleeve 222 and adapted to engage in a slot 228 formed in a web 229 carried by the bracket 199. When the hopper is in its rear position, that is with its outlet spaced from the platform 185, the sleeve 222 is urged downwardly by a spring 230 to the position shown in Figure 11 of the drawings. In this position the pins 225 and 226 are out of engagement with each other so that the shaft 211 is not driven. When, however, the hopper 200 is swung around its axis to a position over the platform 185, the lugs 223 ride out of the grooves 221 to force the sleeve 222 upwardly and to engage the pins 226 with the pins 225 and to thus clutch the shaft 196 to the bushing 215 to drive the gear 214.

In operation, after the capsules have been unjoined in the unit A, the upper plate 60 carrying the caps of the capsules is positioned on a support 235 arranged substantially centrally of the base 16. The lower plate 59 carrying the bases of the capsules is then positioned on the platform 185 and the platform 185 is rotated, whereby the powder or other material from the hopper 200 may be fed into these bases. The hopper 200 is provided with a relatively wide outlet 236, the same being preferably of a sufficient diameter to simultaneously cover all three rows of apertures 63 in the plate 59. The lower end of the hopper 200 is arranged in proximity to the plate 185 so that when the plate 59 is positioned on the plate 185 there will be no possibility of the powder being discharged from between the hopper 200 and the plate 59. To form a closure for the opening 236 in the lower end of the hopper 200, there is provided a platform 237 carried by the base 16 adjacent the platform 185, and this platform is adapted to engage the lower end of the hopper 200 when the hopper is swung about its axis to a point away from the platform 185. A pin 238 carried by the platform 237 limits rearward swinging of the hopper 200, while a pin 239 carried by the hopper 200 is adapted to engage the plate 59 to limit forward swinging of the hopper.

After the bases of the capsules have been filled on the platform 185, the caps are then rejoined with the bases, and the capsules are ejected from the plates 59 and 60 by the unit C. By reference to Figure 1, it will be noted that there is provided a housing 250 arranged substantially centrally of the base 16 and adjacent the rear edge of the same. This housing 250 is open at its upper end and supports a disk 251 of substantially the same size as the plates 59 and 60. The disk 251 is provided on its face with a plurality of pins 252, which pins are spirally arranged and are adapted to engage the apertures 63 in the plates 59 and 60. Suitable pins 253 carried by the housing 250 and a guide member 254 carried by the disk 251 serve to position the plates 59 and 60 relative to the disk 251 and to support these plates.

After the bases of the capsules have been filled on the platform 185, the plate 60 carrying the caps of the capsules is placed on the plate 59 on the platform 185, and the two plates are then positioned on the pins 253 of the unit C. A cover plate 255 slidably and rotatably mounted on a pin 256 carried by the lug 257 on the disk 251 is then swung downwardly to cover the disks 59 and 60. In positioning the plates 59 and 60 on the pins 253, the plate 59 is placed adjacent the disk 251 and the plate 60 is arranged in front of the plate 59. The cover plate 255, when turned downwardly, engages the plate 60 and the cover plate 255, and plates 59 and 60 are then shoved rearwardly so that the pins 252 will enter the apertures 63. The plate 255 will prevent the caps of the capsules from being forced out of the plate 60, and the pins 252 will force the filled bases of the capsules outwardly into engagement with the said caps.

After the capsules have thus been joined together again, the plate 255 is swung back to the position shown in Figure 1 and the plates 59 and 60 are moved still further backward on the pins 253. This backward movement causes the pins 252 to eject the capsules from the plates 59 and 60, whereby the capsules drop downwardly into the housing 250. Arranged within the housing 250 is a screen 265 adapted to receive the capsules as they are discharged from the plates 59 and 60. This screen is mounted at an angle to the horizontal, whereby the capsules will fall by gravity to the right to be discharged into a suitable chute 266 from which they fall to a container, not shown, mounted in the pedestal 15. Any loose powder carried by the capsules falls through the screen 265 and is received in a drawer 267 carried by the housing 250.

From the above, it is believed that the operation of the apparatus will be readily apparent. The hopper 25 is filled with a plurality of capsules, and these capsules are fed downwardly into the plates 59 and 60, where they are unjoined in the manner aforesaid. The upper plate 60 is then positioned on the support 235, while the lower plate 59 is positioned on the platform 185, whereby the bases of the capsules carried by the plate 59 may be filled from the hopper 200. After the bases of the capsules have been properly filled, the plate 60 is again positioned on top of the plate 59, and the two plates are placed on the pins 253 of the unit C, whereby the capsules may be rejoined and ejected in the manner aforesaid.

While one embodiment of the inventive idea has been described somewhat in detail, it is to be clearly understood that this description is for the purpose of illustration only and is not to be construed as definitive of the limits to which the inventive principals may be applied. Reservation is, therefore, made to make such changes in the details of construction and arrangement of parts as will fall within the purview of the accompanying claims.

What we claim as our invention is:

1. In a capsule filling machine, a rotatable plate, a shaft mounting said plate, a ratchet wheel secured to said shaft, a sleeve journaled on said ratchet wheel, a pawl block carried by said sleeve, a pawl within said pawl block engageable with said ratchet wheel, a reciprocatory shaft and a connection between said reciprocatory shaft and said pawl block.

2. In a capsule filling machine, a rotatable plate, a drive for said plate including a ratchet wheel and a pawl engageable with said ratchet wheel, and means for disengaging said pawl from said ratchet wheel, said means including a plate movable to a position to retract said pawl.

3. In a capsule filling machine, a rotatable plate, a shaft for rotating said plate, a ratchet wheel for rotating said shaft, a pawl for actuating said ratchet wheel, a roller carried by said pawl and a plate rotatably journaled on said shaft for movement to a position to engage said roller to shift said pawl out of engagement with said ratchet wheel.

4. In a capsule filling machine, a rotatable plate, a shaft for rotating said plate, a ratchet wheel for rotating said shaft, a pawl for actuating said ratchet wheel, a spring urging said pawl into engagement with said ratchet wheel, a roller carried by said pawl, a member rotatably journaled on said shaft and means for moving said member to cause the same to engage said roller to shift said pawl out of engagement with said ratchet wheel against the tension of said spring.

5. In a capsule filling machine, a rotatable plate, a shaft for rotating said plate, a ratchet wheel for rotating said shaft, a pawl for actuating said ratchet wheel, a member movable to shift said pawl out of engagement with said ratchet wheel, an arm for moving said member, and means for locking said arm against movement.

6. In a capsule filling machine, a rotatable plate, a shaft for rotating said plate, a ratchet wheel for rotating said shaft, a pawl for actuating said ratchet wheel, a member movable to shift said pawl out of engagement with said ratchet wheel, an arm for moving said member, and means for locking said arm against movement, said means including a stationary plate provided with cut out portions and a lug carried by said arm yieldably urged into engagement with said plate.

7. In a capsule filling machine, a rotatable plate, a drive for said plate, a member movable to unclutch said drive from said plate, an arm for moving said member, and means urging said arm to a position where said member effects an unclutching of said drive.

8. In a capsule filling machine, a rotatable plate, a drive for said plate, an arm movable to a position where it effects an unclutching of said drive, means urging said arm to said unclutching position, and means locking said arm in clutching position.

9. In a capsule filling machine, a rotatable plate, a drive for said plate, a control arm for effecting a clutching and unclutching of said drive to said plate, means locking said arm against movement, and a member slidably mounted on said arm for effecting an unlocking of said locking means.

10. In a capsule filling machine, a rotatable plate, a drive for said plate, a control arm for effecting a clutching and unclutching of said drive to said plate, means urging said arm to unclutching position, means locking said arm in clutching position and means automatically operable upon a predetermined rotation of said plate for releasing said locking mechanism.

11. In a capsule filling machine, a rotatable plate, a reciprocatory plate, a common shaft for supplying power to both of said plates and means automatically operable upon a predetermined rotation of said rotatable plate for effecting a disconnection of both of said plates from said power shaft.

12. In a capsule filling machine, a plate provided with a plurality of apertures for receiving capsules, a capsule feeding mechanism, and means for moving said capsule feeding mechanism to cause the same to successively register with each of said apertures, said means including means constantly tending to move said capsule feeding mechanism, a roller carried by said capsule feeding mechanism and a cam engageable with said roller.

13. In a capsule filling machine, a plate, means for rotating the plate, the said plate being provided with a plurality of apertures arranged at variable distances from the axis of said plate, a capsule feeding mechanism and means for moving said capsule feeding mechanism to cause the same to successively register with the apertures in said plate during the rotation of said plate.

14. In a capsule filling machine, a rotatable plate provided with a plurality of apertures arranged spirally of its axis, means for rotating said plate, a capsule feeding mechanism and means for moving said capsule feeding mechanism to cause the same to follow the spiral of said apertures during rotation of said plate.

15. In a capsule filling machine, a medicine hopper, a plate for supporting capsules to be filled, means mounting said hopper for movement relative to said plate, an agitator for said hopper, a clutch for controlling the actuation of said agitator and means operable to actuate said clutch upon movement of said hopper.

16. In a capsule filling machine, a medicine hopper, a plate for supporting capsules to be filled, means mounting said hopper for movement relative to said plate, an agitator for said hopper, and means for controlling the actuation of said agitator in dependence upon the movement of said hopper.

17. In a capsule filling machine, a rotatable plate provided with a plurality of apertures arranged spirally of its axis, means for rotating said plate, a capsule feeding mechanism, means for moving said capsule feeding mechanism to cause the same to register with said apertures during rotation of said plate, and means for automatically stopping the rotation of said plate after said capsule feeding mechanism has registered with all of the apertures in said plate.

18. In a capsule filling machine, a rotatable plate mechanism provided with a plurality of apertures arranged spirally of its axis, a capsule feeding mechanism, and means for moving said mechanisms to cause the capsule feeding mechanism to register successively with said spirally arranged apertures.

In testimony whereof we affix our signatures.

WARREN WILKIE.
ARTHUR A. LEVERENZ.